(12) United States Patent
Miyashita

(10) Patent No.: US 7,121,084 B2
(45) Date of Patent: Oct. 17, 2006

(54) DEVICE FOR CONTROLLING AN INTERNAL COMBUSTION ENGINE

(75) Inventor: Shigeki Miyashita, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 98 days.

(21) Appl. No.: 10/911,662

(22) Filed: Aug. 5, 2004

(65) Prior Publication Data

US 2005/0034451 A1 Feb. 17, 2005

(30) Foreign Application Priority Data

Aug. 12, 2003 (JP) ............................. 2003-207335

(51) Int. Cl.
*F01N 3/00* (2006.01)

(52) U.S. Cl. ..................... 60/285; 60/280; 60/284; 60/300; 180/65.2; 180/65.3; 180/65.4

(58) Field of Classification Search .......... 60/274, 60/276, 277, 280, 284, 285, 297, 300; 180/65.2, 180/65.3, 65.4
See application file for complete search history.

(56) References Cited

U.S. PATENT DOCUMENTS

| | | | | |
|---|---|---|---|---|
| 5,323,868 A | * | 6/1994 | Kawashima | ............... 180/65.4 |
| 6,059,057 A | * | 5/2000 | Yamazaki et al. | ......... 180/65.2 |
| 6,173,569 B1 | * | 1/2001 | Kusada et al. | ................. 60/277 |
| 6,327,852 B1 | * | 12/2001 | Hirose | .......................... 60/297 |
| 6,434,928 B1 | * | 8/2002 | Manaka | ........................ 60/274 |
| 6,657,315 B1 | * | 12/2003 | Peters et al. | .............. 290/40 C |
| 6,742,327 B1 | * | 6/2004 | Inoue et al. | .................. 60/285 |

FOREIGN PATENT DOCUMENTS

| | | |
|---|---|---|
| JP | A 7-91306 | 4/1995 |
| JP | A 2002-221062 | 8/2002 |
| JP | A 2002-285883 | 10/2002 |

* cited by examiner

*Primary Examiner*—Binh Q. Tran
(74) *Attorney, Agent, or Firm*—Oliff & Berridge, PLC

(57) ABSTRACT

In elevating the exhaust gas temperature for conducting the sulfur contamination-removing operation for a $NO_x$ occluding and reducing catalyst, a motor/generator is driven by the electric power from a battery while operating an internal combustion engine of a hybrid vehicle to produce a low output, and the wheels are driven via the internal combustion engine, power change-over mechanism and transmission. A motor assist is effected for increasing the output of the motor/generator during a period in the expansion stroke in each cylinder of the engine to increase the engine rotational speed during the above period only. Then, the exhaust valve is opened before the combustion is completed in the cylinder, and the exhaust gas temperature is raised.

7 Claims, 3 Drawing Sheets

DEVICE FOR CONTROLLING AN INTERNAL COMBUSTION ENGINE

BACKGROUND OF THE INVENTION

1. Field of the Invention

The present invention relates to a device for controlling an internal combustion engine and, more specifically, to a device for controlling an internal combustion engine provided with a drive assist unit for assisting the rotation of the engine.

2. Description of the Related Art

In internal combustion engines, it is often required to raise the temperature of the exhaust gas. In the engine equipped with an exhaust gas purifying catalyst in the exhaust gas passage, for example, it is required, at the start of the engine, to raise the temperature of the exhaust gas to activate the catalyst by elevating the catalyst temperature. Further, a $NO_x$ occluding and reducing catalyst is known which occludes $NO_x$ in the exhaust gas when the air-fuel ratio of the exhaust gas flowing in is lean and purifies the occluded $NO_x$ by reduction with reducing components in the exhaust gas when the air-fuel ratio of the exhaust gas that is flowing in becomes rich. When the $NO_x$ occluding and reducing catalyst is used for a exhaust gas purifying catalyst, the sulfur oxide in the exhaust gas is occluded by the catalyst together with the $NO_x$ and builds up in the catalyst. In order to conduct a sulfur contamination-removing operation for releasing the occluded sulfur-oxide from the catalyst, it is necessary to maintain the catalyst at a high temperature by elevating the temperature of the exhaust gas.

When the engine is operated at a high load, the temperature of the exhaust gas rises without conducting any particular operation. When the engine is operated at a low load, however, the temperature of the exhaust gas is usually low and must be forcibly raised.

In order to raise the temperature of the engine exhaust gas, for example, usually the ignition timing of the engine is retarded (i.e., delayed)), as disclosed in Japanese Unexamined Patent Publication (Kokai) No. 2002-221062.

When the ignition timing of the engine is delayed, the air-fuel mixture in each cylinder starts burning in a delayed timing. When the exhaust valve in each cylinder is opened, therefore, the combustion gas that has not been completely burned yet is discharged into the exhaust gas passage from the cylinder. Therefore, an increased proportion of the combustion energy of the mixture is discharged into the exhaust gas passage together with the exhaust gas without being converted into the mechanical energy (i.e., an engine output).

Thus, the catalyst temperature can be raised by delaying the engine ignition timing when it becomes necessary to conduct the sulfur contamination-removing operation for the $NO_x$ occluding and reducing catalyst during the warming up period after the cold start of the engine or when the engine is operated at conditions where the exhaust gas temperature is low.

Japanese Unexamined Patent Publication (Kokai) No. 2002-285883 teaches a control device for elevating the temperature of the exhaust gas at the cold start of the internal combustion engine mounted on a so-called hybrid vehicle equipped with an auxiliary drive unit such as an electric motor.

Namely, in the engine of the '883 publication, the fuel necessary for obtaining a target air-fuel ratio of the engine is partly injected in the expansion stroke of the engine during the warming up after the start of the engine, in order to raise the temperature of the exhaust gas discharged from the cylinder when the exhaust valve is opened, so that the exhaust gas of a high temperature arrives at the catalyst.

When the ignition timing of the engine is delayed as described in the '062 publication, however, the combustion usually loses stability. Therefore, if the temperature of the exhaust gas is raised by delaying the ignition timing during the warming-up period after the cold start of the engine, the revolution of the engine fluctuates and misfiring occurs in an extreme case. In the engine mounted on the vehicle, further, if the temperature of the exhaust gas is raised by delaying the ignition timing in order to remove the sulfur contamination from the $NO_x$ occluding and reducing catalyst when the vehicle is running, the output torque fluctuates due to unstable combustion, and the operability of the vehicle is deteriorated.

According to '883 publication, further, the temperature of the exhaust gas is raised by injecting a part of the fuel during the cylinder expansion stroke of the internal combustion engine for a hybrid vehicle. In order to raise the temperature of the exhaust gas by injecting the fuel during the cylinder expansion stroke, however, direct cylinder fuel injection valves are necessary for injecting the fuel directly into the cylinders.

Further, operating modes of a hybrid vehicle usually include a charge traveling mode operation in which the vehicle is driven by the output of the internal combustion engine and, at the same time, the generator is driven by the engine and the generated electric power is stored in a rechargeable battery, as well as an EV (electric vehicle) traveling mode operation in which the vehicle is driven by an electric motor using the electric power stored in the rechargeable battery while halting the engine when the rechargeable battery is in a fully charged state (when the state of charge (hereinafter referred to as "SOC") is full).

If it becomes necessary to raise the temperature of the exhaust gas to remove the sulfur contamination from the $NO_x$ occluding and reducing catalyst, the temperature of the exhaust gas can be raised by injecting the fuel in the expansion stroke, as taught in '883 publication, or by delaying the ignition timing, as taught in '062 publication, when the vehicle is running in the charge traveling mode. However, if the SOC is full and the vehicle is running in the EV traveling mode, the engine must be halted or must be operated at a low load.

When the engine is halted, the exhaust gas of a high temperature cannot be supplied to the catalyst, as a matter of course. When the operation of the engine is continued at a low load, the temperature of the exhaust gas cannot be raised to a sufficient degree even if the ignition timing is delayed as taught in '062 publication or the fuel is injected during the expansion stroke as taught in '883 publication.

In the engine of the hybrid vehicle, therefore, when the EV traveling mode operation takes place due to a full SOC, the temperature of the exhaust gas drops and the sulfur contamination-removing operation for the $NO_x$ occluding and reducing catalyst is interrupted if it is being executed.

The sulfur contamination-removing operation in this case is resumed when the charge traveling mode operation starts. However, the temperature of the catalyst that was high when the operation was interrupted, has now been lowered after the EV traveling mode operation. To resume the sulfur contamination-removing operation, therefore, the temperature of the catalyst must be raised again with extra energy and time and, thereby, the sulfur contamination-removing operation cannot be conducted efficiently.

SUMMARY OF THE INVENTION

In view of the problems in the related art as set forth above, it is an object of the present invention to provide a device for controlling an internal combustion engine capable of preventing the combustion of the engine from becoming unstable, and of raising the temperature of the exhaust gas even during the full SOC of the battery for a hybrid vehicle.

One or more of the objects as set forth above are achieved by a device for controlling an internal combustion engine having a exhaust gas purifying catalyst disposed on the exhaust gas passage thereof and a drive assist unit for assisting the rotation of the engine crankshaft, wherein, when the temperature of the catalyst is lower than a predetermined temperature, the device performs a warming assist operation in which said drive assist unit is actuated in order to assist the rotation of the engine until the temperature of the catalyst rises to the predetermined temperature.

Further, according to the present invention, there is provided a device for controlling an internal combustion engine having a drive assist unit for assisting the rotation of the engine crankshaft, wherein when it is necessary to raise the temperature of the engine exhaust gas, the device performs a warming assist operation in which said drive assist unit is actuated during a predetermined period in a cycle of strokes of the internal combustion engine to assist the rotation of the engine, so that a decreased proportion of the combustion energy produced by the engine is converted into mechanical energy to raise the temperature of the engine exhaust gas.

In the present invention, a drive assist unit for assisting the rotation of the crankshaft of the engine is provided. The words "for assisting the rotation of the crankshaft" in this specification indicate that the device is directly or indirectly coupled to the crankshaft to impart the driving force to the crankshaft in a direction in which the rotation of the crankshaft increases while the engine is in operation.

In the engine equipped with the drive assist unit, the temperature of the exhaust gas can be raised by assisting the rotation of the engine crankshaft, for example, within a particular period in a cycle of the stoke of the cylinders and increasing the rotation speed of the crankshaft for a short period of time.

Therefore, the temperature of an exhaust gas purifying catalyst disposed in the exhaust gas passage can be raised to a required temperature (i.e., the catalyst can be warmed-up) by raising the exhaust gas temperature by assisting the rotation of the engine crankshaft.

For example, the combustion of the air-fuel mixture in the engine combustion chamber occurs at a combustion rate which is not directly related to the rotational speed of the engine. Usually, the ignition timing of the engine is set in accordance with the rotational speed of the engine in such a manner that the combustion of the air-fuel mixture is nearly completed before the exhaust valve of the cylinder is opened. Therefore, most of the energy due to the combustion is generated in the combustion chamber, and a major proportion of the combustion energy is converted in the expansion stroke into a work for pushing the piston down, i.e., converted into the mechanical energy generated by the engine.

In the warming assist operation of the invention, the mechanical rotation is increased by the drive assist unit to open the exhaust valve before the combustion of the mixture in the combustion chamber is completed, so that a decreased proportion of the combustion energy is converted into the mechanical energy via the piston.

That is, by increasing the engine rotation, the exhaust gas that has not been completely burned and is still burning is discharged into the exhaust gas passage from the exhaust valve, and, therefore, the temperature of the exhaust gas is greatly raised.

In order to prevent the engine rotational speed from greatly increasing due to the warming assist operation, it is desired that the rotation of the engine is assisted by the drive assist unit not for all the cycle of strokes of the cylinder but in only a predetermined period in the cycle of strokes.

It is essential that the above particular period at least overlaps a period from the start of combustion in the cylinder combustion chamber until the exhaust valve is opened. It is preferable that this particular period is as short as possible for suppressing the increase in the rotation speed of the engine, and is, for example, within a part of the expansion stroke in the cylinder.

In the above warming assist operation, the ignition timing is not changed from an ordinary value and, hence, the timing for igniting the mixture is nearly the same as that of in the normal operation. However, unlike the case when the ignition timing is delayed due to largely retarded ignition timing, the combustion does not become unstable, and the engine operates maintaining stability.

DESCRIPTION OF THE PREFERRED EMBODIMENT

An embodiment of the invention will now be described with reference to the accompanying drawings.

Figure 1:
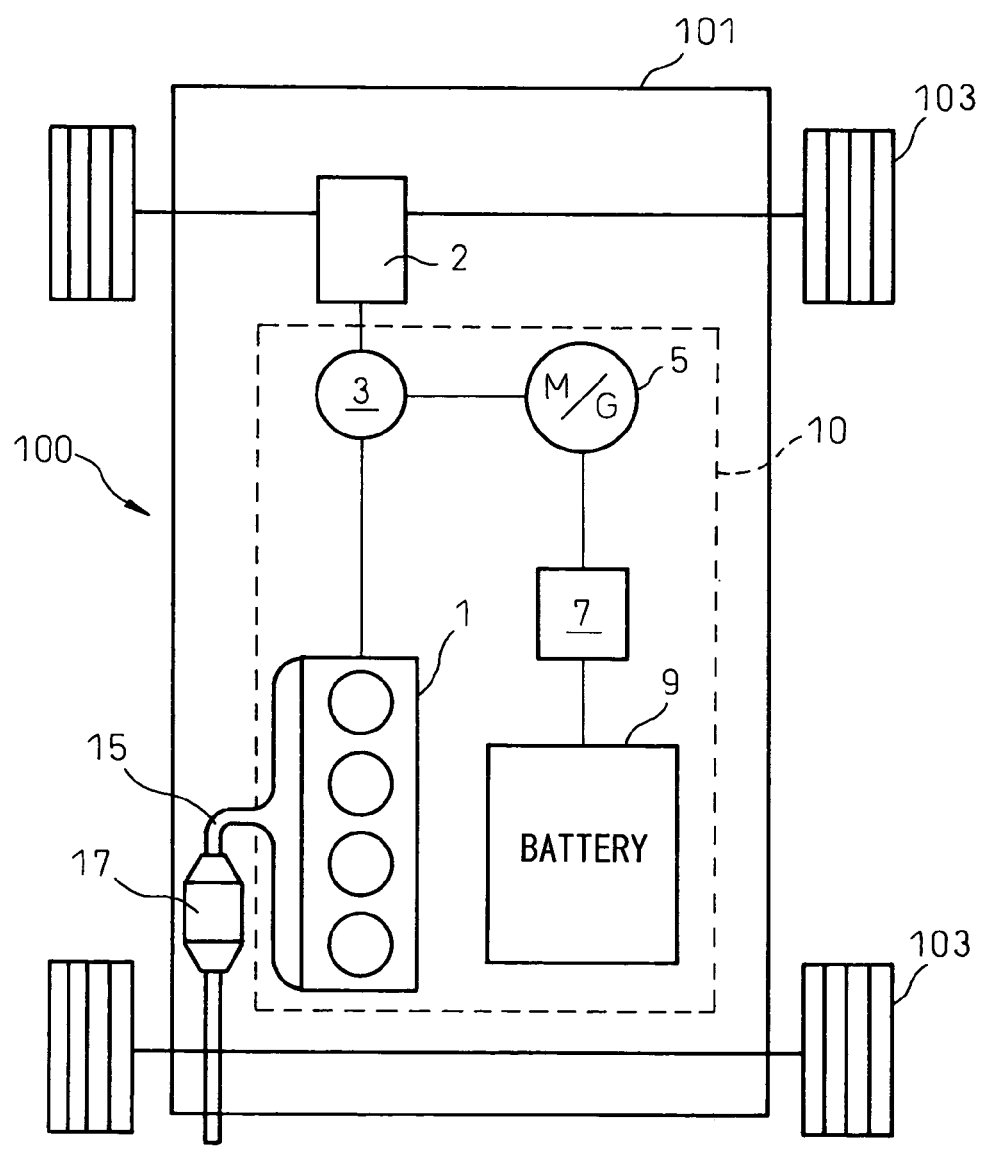
FIG. 1 is a view schematically illustrating the constitution of the embodiment of the present invention when it is applied to an internal combustion engine for a hybrid vehicle.

FIG. 1 is a diagram schematically illustrating the constitution of an embodiment when the invention is applied to an internal combustion engine for a hybrid vehicle.

In FIG. 1, reference numeral 100 denotes a hybrid vehicle as a whole, 101 denotes a body of the vehicle 100, reference numeral 103 denotes wheels, and 10 denotes a power unit mounted on the body 101 of the vehicle 100.

The power unit 100 includes an internal combustion engine 1, a motor/generator 5 coupled to the output shaft of the engine 1 via a power change-over mechanism 3, and an inverter 7 with a converter which, when the motor/generator 5 is working as a generator, converts the output power (AC power) thereof into a DC power to electrically charge a battery 9 and which, when the motor/generator 5 is working as a motor, inverts a DC current from the battery 9 into AC power having a given voltage and a frequency to supply the power to the motor/generator 5.

In this embodiment, the internal combustion engine 1 is a 4-cylinder 4-cycle supercharged lean-burn gasoline engine that can be operated over a wide air-fuel ratio range of from a rich air-fuel ratio through up to a lean air-fuel ratio.

The output shaft of the engine 1 and the input/output shaft of the motor/generator 5 are coupled, via the power change-over mechanism 3, to a transmission 2 for driving the wheels 103 of the vehicle 100.

The power change-over mechanism 3 makes the connection and disconnection between the transmission 2 and the output shaft of the engine 1, and between the transmission 2 and the input/output shaft of the motor/generator 5. Namely, the power change-over mechanism 3 connects the output shaft of the internal combustion engine 1 only to the transmission 2, connects the input/output shaft of the motor/generator 5 only to the transmission 2, or connects both of them simultaneously to the transmission 2 to drive the wheels 103. Further, the power change-over mechanism 3 connects the output shaft of the internal combustion engine 1 and the input/output shaft of the motor/generator 5 together while disconnecting them from the transmission 2 to generate electricity by the motor/generator 5 or to perform cranking of the engine at the start of the engine 1.

In this embodiment, a $NO_x$ occluding and reducing catalyst 17 is arranged in the exhaust pipe 15 of the internal combustion engine 1. The $NO_x$ occluding and reducing catalyst 17 works to occlude in the catalyst the $NO_x$ component in the exhaust gas by absorption, by adsorption or by both of them when the exhaust gas air-fuel ratio of the engine 1 is lean, and to purify by reduction the occluded $NO_x$ with reducing components such as HC component and CO in the exhaust gas when the exhaust gas air-fuel ratio of the engine 1 becomes rich.

In this embodiment, the control device (not shown) of the engine 1 works to operate the engine 1 at a lean air-fuel ratio during the normal operation. Thus, the exhaust gas of a lean air-fuel ratio flows into the $NO_x$ occluding and reducing catalyst 17, and the $NO_x$ component in the exhaust gas is occluded by the $NO_x$ occluding and reducing catalyst 17.

When the operation of the engine 1 at a lean air-fuel ratio is continued to some extent and the amount of $NO_x$ occluded in the $NO_x$ occluding and reducing catalyst 17 increases to a predetermined level, the control device operates the engine 1 at a rich air-fuel ratio for a short period of time to supply the exhaust gas of a rich air-fuel ratio to the $NO_x$ occluding and reducing catalyst 17 thereby to purify by reduction the $NO_x$ occluded in the catalyst 17.

As described above, the $NO_x$ occluding and reducing catalyst 17 occludes the $NO_x$ and purifies the $NO_x$ by reduction repetitively while the engine 1 is in operation.

Generally, however, the exhaust gas of the engine 1 contains a trace amount of sulfur oxide ($SO_x$), and the $NO_x$ occluding and reducing catalyst 17 works to occlude $SO_x$ like $NO_x$ when the exhaust gas air-fuel ratio is lean. When being occluded, the $SO_x$ forms a sulfate which remains relatively stable and is not easily released from the $NO_x$ occluding and reducing catalyst 17 unlike $NO_x$ even by enriching the exhaust gas air-fuel ratio. When the $NO_x$ occluding and reducing catalyst 17 repeats the occlusion and reduction of $NO_x$, therefore, the sulfur compounds gradually builds up in the catalyst 17.

As the $SO_x$ is occluded in an increased amount by the $NO_x$ occluding and reducing catalyst 17, the maximum amount of $NO_x$ which the $NO_x$ occluding and reducing catalyst can occlude decreases by the amount corresponding to the amount of the $SO_x$ occluded by the $NO_x$ occluding. Thus, the $NO_x$ occluding capability of the $NO_x$ occluding and reducing catalyst occurs, i.e., a so-called sulfur contamination occurs.

To remove the sulfur contamination and to recover the $NO_x$ occluding capability of the catalyst 17, it is necessary to conduct the sulfur contamination-removing operation by supplying the exhaust gas of a rich air-fuel ratio while maintaining the catalyst 17 at a high temperature for a certain period of time.

In this case, the exhaust gas temperature of the engine 1 must be raised in order to supply the exhaust gas of a high temperature to the catalyst 17. If the engine 1 can be operated at a high load, then, the exhaust gas temperature can be raised easily by operating the engine 1 at a high load.

In this embodiment, however, the internal combustion engine 1 is used as a power unit for the hybrid vehicle, and is operated in modes different from those of the engines for ordinary vehicles.

Generally, the internal combustion engine 1 of this embodiment is operated in one of the following three modes.
(1) Engine traveling mode
(2) Charge traveling mode
(3) EV traveling mode In the engine traveling mode operation (1), the whole output of the engine 1 is fed to the transmission 2 via the power change-over mechanism 3. The operation in this mode is carried out when the engine 1 can be operated in a load region where good engine efficiency is accomplished, and the output of the engine 1 is used solely for driving the wheels 103. When a large output such as quick acceleration is required in this mode, the motor assist operation is often effected to increase the output by feeding the output of the motor/generator 5 to the transmission 2 in addition to feeding the output of the engine 1.

In the charge traveling mode operation (2), the output of the engine 1 is partly transmitted to the transmission 2 through the power change-over mechanism 3 to drive the wheels 103, and the remainder thereof is transmitted to the motor/generator 5 to generate electricity. In this state, as the engine 1 carries both the load for driving the vehicle and the load for generating electricity by the motor/generator 5, the engine 1 is operated at a high load.

In the EV traveling mode operation (3), the output shaft of the engine 1 is disconnected from the transmission 2, and only the output of the motor/generator 5 is transmitted to the transmission 2 through the power change-over mechanism 3. In this mode, the engine 1 is halted.

In this embodiment, the operation mode is such that the state of charge (SOC) of the battery 9 is kept at about 50% of the full charge during the normal operation, so that the operation efficiency of the power unit becomes the highest.

In order to effect the sulfur contamination-removing operation for the $NO_x$ occluding and reducing catalyst 17 as described above, the exhaust gas temperature of the engine 1 must be raised.

In this case, the SOC of the battery 9 has usually been controlled to be about 50%. Therefore, by forcibly operating the engine in the charge traveling mode (2) by increasing a target control value of the SOC to be, for example, 100%, the engine load can be increased and, hence, the exhaust gas temperature can be raised.

However, if the operation is continued in the charge traveling mode, the SOC of the battery gradually increases and the battery finally arrives at the full SOC (100%). When the battery arrives at the full SOC, the electric charge cannot be conducted any more. Therefore, the engine 1 must be operated in the engine traveling mode, or, alternatively, the vehicle must be operated in the EV traveling mode while halting the engine in order to lower the SOC of the battery 9 so that the operation in the charge traveling mode can be resumed.

In this engine traveling mode operation, the engine load decreases and, hence, the exhaust gas temperature drops. In the EV traveling mode operation, the engine 1 is halted and no exhaust gas is supplied to the catalyst. In either case, therefore, the catalyst temperature drops due to cooling. Therefore, even if the sulfur contamination-removing operation is commenced by elevating the catalyst temperature in the charge traveling mode operation, the catalyst temperature drops if the battery 9 arrives at the full SOC and, hence, the sulfur contamination-removing operation is interrupted.

If the SOC of the battery 9 decreases, the operation in the charge traveling mode can be resumed. In this case, however, it is necessary to raise the once dropped catalyst temperature again up to a predetermined temperature. This requires a large amount of energy for re-heating the catalyst and increases the period of time for the sulfur contamination-removing operation as a whole. Namely, the sulfur contamination-removing operation is conducted very poorly.

On the other hand, if the ignition timing of the engine 1 is delayed as in the related art described above, the exhaust gas temperature of the engine can be raised in a region where the load is relatively low. If the ignition timing is delayed, however, the combustion of the engine 1 becomes unstable. In particular, the operability of the vehicle is deteriorated in the engine traveling mode.

In this embodiment, these problems are solved by conducting the warming assist operation as described below.

In the warming assist operation of this embodiment, the motor assist operation is conducted in a similar manner as that of quick acceleration in the engine traveling mode operation.

That is, in the warming assist operation, the engine is operated at a load lower than the load of driving the vehicle, and the differential power between the driving load and the engine output is supplied from the motor generator 5. Namely, the motor assist operation is conducted at all times even in the engine traveling mode operation in a relatively low load operating region except for the quick acceleration. Therefore, even when the charge traveling mode operation can no longer be conducted due to a full SOC, the electric power stored in the battery 9 is decreased and, thereby, the SOC can be lowered even in the engine traveling mode operation.

In this case, the engine 1 is operated at a load lower than that in the normal engine traveling mode and, hence, the exhaust gas temperature further decreases.

However, in the warming assist operation of this embodiment, the rotational speed of the motor/generator 5 is increased for a short period of time during the expansion stroke in each cylinder of the engine 1 to increase the rotational speed of the engine 1. That is, the rotational speed of the motor/generator 5 is increased for a short period of time during the motor assist operation, to increase the output of the motor/generator 5, whereby the engine crankshaft rotating in synchronism with the motor/generator carries a load decreased by an increment of the output (torque) of the motor/generator 5, and its rotational speed thereof increases.

This makes it possible to increase the engine rotational speed in only part of the period of the expansion stroke of each cylinder and to raise the exhaust gas temperature of the engine 1.

Figure 2:
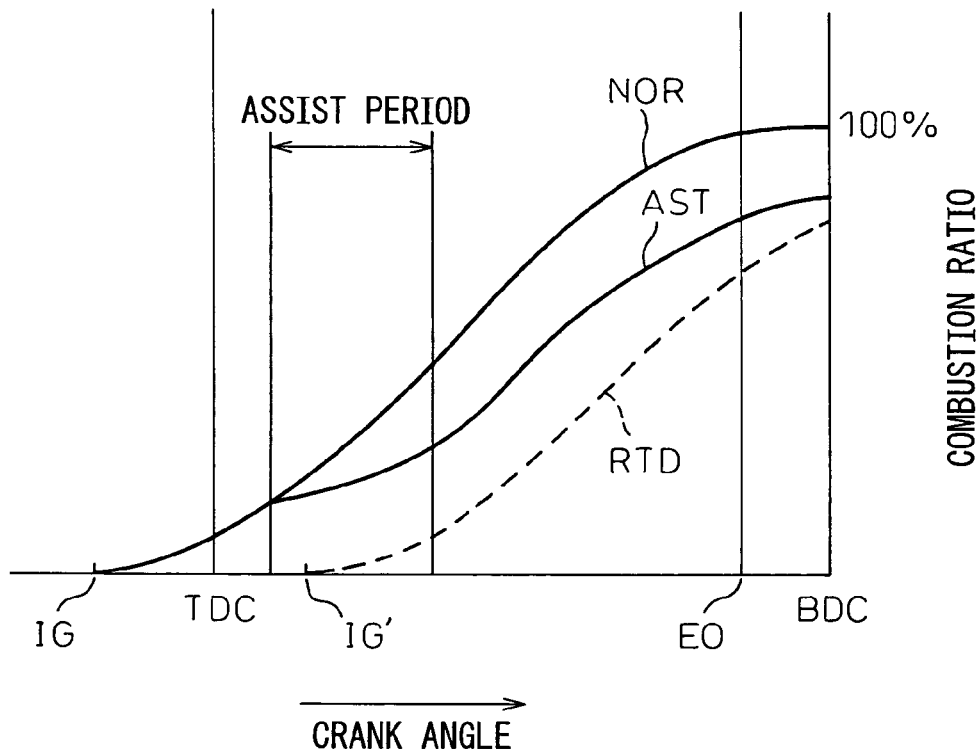
FIG. 2 is a timing diagram for illustrating the warming assist operation.

Described below with reference to FIG. 2 is the reason why the exhaust gas temperature is raised by an increase in the engine speed being assisted by the motor in part of the period in the expansion stroke in each cylinder of the engine 1.

FIG. 2 is a diagram illustrating the combustion ratio of the air-fuel mixture in the expansion stroke in each cylinder, wherein the ordinate represents the combustion ratio (%) of the air-fuel mixture and the abscissa represents the timing. The TDC on the abscissa represents the top dead center in the compression stroke and the BDC represents the bottom dead center in the expansion stroke. Further, EO represents the timing for opening the exhaust valve of the cylinder and is set slightly ahead of the BDC.

A curve NOR in FIG. 2 represents a normal change in the combustion ratio of the air-fuel mixture (neither assisted by the motor nor the ignition timing is delayed). Usually, the engine ignition timing is set ahead of the top dead center TDC, and the mixture in the cylinder starts burning after being ignited at a point IG on the abscissa in FIG. 2. In this case, the combustion ratio increases in accordance with the combustion rate determined by various conditions. Usually, the mixture is burned nearly 100% when the exhaust valve of the cylinder starts opening (EO) and is completely burned by the time the exhaust valve is fully opened.

Further, the dotted line RTD in FIG. 2 represents the case where the ignition timing is delayed. Upon delaying the ignition timing, the timing for igniting the air-fuel mixture in the cylinder is shifted to a point IG' after the top dead center. However, the combustion rate itself does not much change in this case and, hence, the combustion ratio (curve RTD) in this case forms a curve which is a parallel translation toward the right in the drawing from the normal combustion ratio (curve NOR). When the exhaust valve starts opening (EO), therefore, the combustion ratio does not reach 100%. Therefore, the air-fuel mixture which remains unburned at the opening of the exhaust valve does not generate the energy in the cylinder but is discharged into the engine exhaust system where it burns. Therefore, the exhaust gas temperature is raised.

Further, if the ignition timing is delayed, the timing when the air-fuel mixture ignites fluctuates and, this causes a problem in that the combustion state becomes unstable and the output and rotational speed of the engine also fluctuate.

Referring to FIG. 2, a curve AST represents a case where the warming assist operation is effected according to the embodiment. In this embodiment, a period (exemplified as "assist period" in FIG. 2) is provided to increase the rotational speed of the engine 1 being assisted by the motor in the expansion stroke of the engine (more strictly, a period after the air-fuel mixture starts burning).

In this period, the combustion rate does not change much from that of the normal case (NOR). However, since the engine rotational speed increases, being assisted by the motor, the combustion rate relatively decreases as represented by the curve AST in FIG. 2, and the combustion ratio decreases relative to the crank rotational angle. In this period, further, the descending speed of the piston is greater than the normal speed. Therefore, the expansion rate of the combustion gas increases, and the combustion rate, in practice, slightly decreases due to a drop of temperature of the combustion gas.

At the end of the assist period, therefore, the combustion ratio of the mixture becomes smaller than that of the normal case. After the end of the assist period, the rotational speed returns to the normal value. Therefore, the subsequent increase in the combustion ratio becomes the same as the increase in the normal combustion ratio, and a curve (AST) of combustion ratio after the end of the assist period is a parallel translation of the normal curve (NOR) toward the right direction in FIG. 2.

Therefore, when there is a motor assist period, the combustion of the air-fuel mixture is not completed at the moment when the exhaust valve starts opening, as when the ignition timing is delayed, and part of the combustion energy is discharged into the discharge system without doing work in the cylinder. Besides, during the period of assisting the warming, the engine rotational speed simply increases in some period but the ignition timing of the engine is maintained normal and the timing for igniting the air-fuel mixture is maintained normal. Unlike when the ignition timing is delayed, therefore, the combustion does not lose stability, and the exhaust gas temperature is raised while maintaining the stable operation.

It is necessary that the motor assist period for the warming assist operation at least partly overlaps the period from the start of combustion in the cylinder combustion chamber to when the exhaust valve is opened. The motor assist period may be longer than the period of from the start of combustion to the opening of the exhaust valve. If the motor assist period becomes too long, however, the average rotational speed of the engine increases. Therefore, it is preferable that the motor assist period is a short period within the expansion stroke. It has been found that the greatest effect for elevating the exhaust gas temperature is obtained if the assist by the motor is effected in a period of from 0 degree of ATDC (after the compression top dead center) to 30 degrees in terms of, for example, the crank angle.

The amount of the power imparted from the motor/generator 5 to the engine during the motor assist period (i.e., degree of engine acceleration during the period of the motor assist period) varies depending upon the type of the engine, operating condition of the engine, and a required increase in the exhaust gas temperature. Therefore, the details should be determined, through experiment, using a practical engine.

During the warming assist operation, further, the motor assist period may be provided for all cylinders of the engine 1 or may be provided for only some cylinders of the engine. When the motor assist period is provided for some cylinders only, further, the motor assist is provided in the expansion stroke, and the output of the motor/generator 5 may be decreased in other strokes (e.g., in the intake stroke and in the compression stroke) to decelerate the engine to cancel an increase in the average rotational speed of the engine caused by the assist from the motor.

Next, the case where the warming assist operation is conducted will be described with reference to FIGS. 3 and 4, wherein the abscissa represents the time and the ordinate represents changes in the catalyst temperature (curve CAT), in the SOC and in the output of the engine 1.

Figure 3:
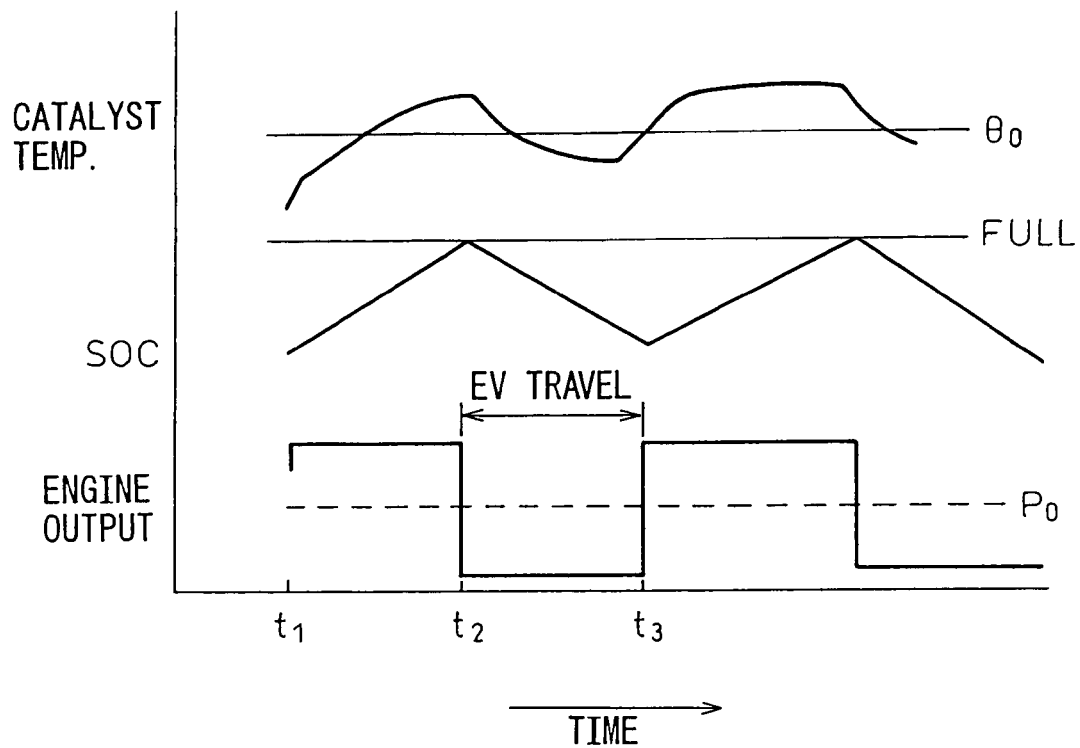
FIG. 3 is a diagram illustrating the sulfur contamination-removing operation in the hybrid vehicle.
Figure 4:
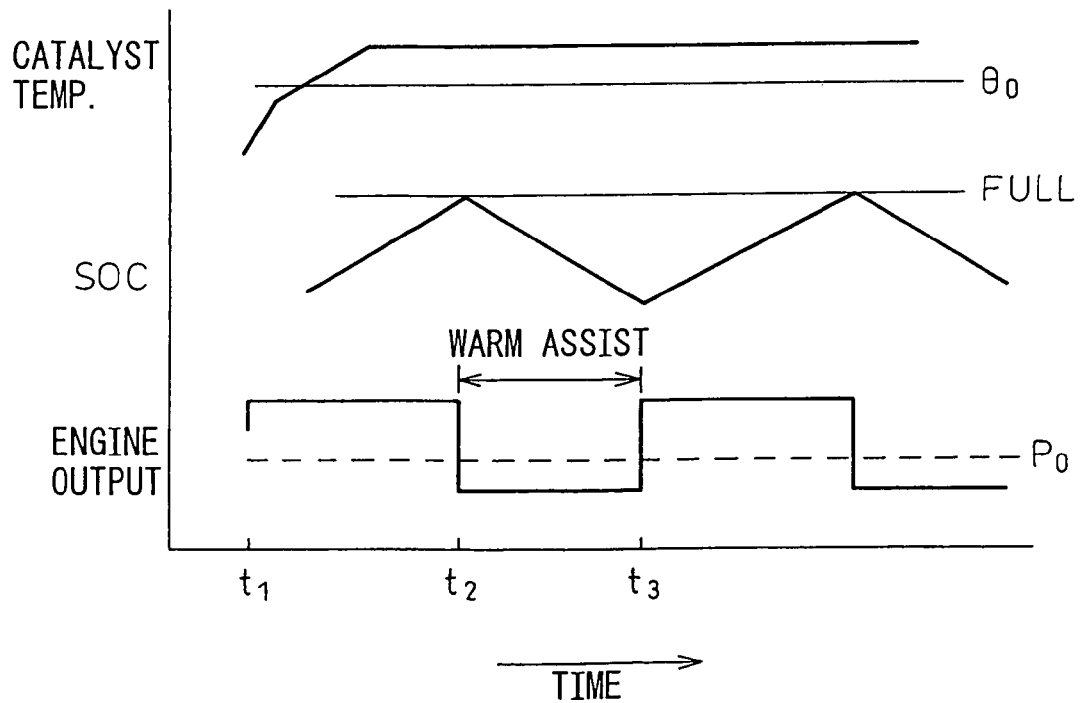
FIG. 4 is a diagram illustrating the contamination-removing operation by employing a warming assist operation in the hybrid vehicle.

FIG. 3 illustrates a case when the charge traveling mode operation and the EV traveling mode operation are alternately repeated as in the conventional manner, and FIG. 4 illustrates a case when the charge traveling mode operation and the engine traveling mode operation with the warming assist operation are alternately repeated.

First, described below is the case of FIG. 3.

In the example of FIG. 3, the charge traveling mode operation starts in a state where the catalyst temperature is lower than a temperature $\theta_0$ which is necessary for the contamination-removing operation (moment $t_1$ in FIG. 3). During the charge traveling mode operation, the engine output is greater than an output ($P_0$ in FIG. 3) necessary for moving the vehicle by the engine output only, and the exhaust gas temperature rises. However, as the catalyst temperature at the start is lower than $\theta_0$, a time is required before the temperature of the catalyst is raised; i.e., the catalyst temperature reaches the required temperature $\theta_0$ after some period of time has elapsed from the start of the charge traveling mode operation. The sulfur contamination-removing operation starts from a moment when the catalyst temperature has reached $\theta_0$.

However, the SOC of the battery rises with the start of the charge traveling mode operation. Therefore, the SOC reaches 100% (FULL) within a relatively short period of time from the start of the contamination-removing operation as illustrated in FIG. 3, and the charge traveling mode operation can be continued no longer.

As the operation mode is changed over to the EV traveling mode, therefore, the engine 1 is halted (moment $t_2$ in FIG. 3). As the engine is halted, the exhaust gas of a high temperature is no longer supplied to the catalyst, and the catalyst temperature decreases with the start of the EV traveling mode operation (see the catalyst temperature curve in FIG. 3).

Therefore, at the time ($t_3$ in FIG. 3) where the SOC has decreased due to the EV traveling mode operation and where the charge traveling mode operation can be started again, the catalyst temperature has dropped to be lower than $\theta_0$. Therefore, the sulfur contamination-removing operation is not readily resumed despite charge traveling mode operation commencing and the exhaust gas temperature being raised.

If the charge traveling mode operation and the EV traveling mode operation are alternately repeated as described above, therefore, the energy is wasted for elevating the catalyst temperature and, besides, a long period of time is required before the sulfur contamination-removing operation is completed. This makes it difficult to efficiently conduct the sulfur contamination-removing operation.

In contrast to the above, if the charge traveling mode operation and the warming assist operation are alternately conducted, as illustrated in FIG. 4, the warming assist operation commences when, for example, the SOC becomes full during the charge traveling mode operation. In this case, the engine produces an output smaller than the output $P_0$ needed for traveling the vehicle (see FIG. 4), and a difference between $P_0$ and the engine output is supplied by the motor/generator 5.

The motor/generator 5 further feeds the power for assisting the engine by the motor.

During the warming assist operation, the exhaust gas temperature is maintained high despite the engine being operated at a low output. Therefore, the catalyst temperature, which is raised to the required temperature $\theta_0$ during the charge traveling mode operation, is also maintained during the warming assist operation, and the contamination-removing operation is continued without being interrupted (see the catalyst temperature curve in FIG. 4).

During the warming assist operation, on the other hand, the power for moving the vehicle is also supplied from the motor/generator 5 and, therefore, the SOC continues to decrease during the warming assist operation. After the warming assist operation is executed for a given period of time, the charge traveling mode operation can be effected again. Then, the exhaust gas temperature is maintained high, and the sulfur contamination-removing operation is continued until it is completed without interruption; i.e., the sulfur contamination-removing operation is efficiently conducted.

In the above example, the warming assist operation is conducted while the vehicle is traveling. However, if the engine 1 and the motor/generator 5 are coupled together and are disconnected from the transmission 2 by using the power change-over mechanism 3, then, the warming assist operation can be executed while the vehicle is halted.

Further, the above example illustrated the case where the exhaust gas temperature was raised for effecting the sulfur contamination-removing operation. However, the warming assist operation can be executed even for elevating the catalyst temperature (for warming up the catalyst) for activating the catalyst 17 early after the cold start of the engine.

As explained above, in the embodiment of the present invention, the exhaust gas temperature can be raised, even during the low output operation of the engine, while preventing the engine combustion from losing stability.

The invention claimed is:

1. A device for controlling an internal combustion engine having an exhaust gas purifying catalyst disposed on the exhaust gas passage thereof and a drive assist unit for assisting the rotation of the engine crankshaft, wherein,
   when the temperature of the catalyst is lower than a predetermined temperature, the device performs a warming assist operation in which said drive assist unit is actuated in order to assist the rotation of the engine until the temperature of the catalyst rises to the predetermined temperature, and
   in the warming assist operation, the drive assist unit is actuated only during a predetermined period in a cycle of strokes of the internal combustion engine, to increase a rotation speed of the engine, so that a decreased proportion of the combustion energy produced by the engine is converted into mechanical energy, to raise the temperature of the engine exhaust gas.

2. A device for controlling an internal combustion engine having a drive assist unit for assisting the rotation of the engine crankshaft wherein, when it is necessary to raise the temperature of the engine exhaust gas, the device performs a warming assist operation in which said drive assist unit is actuated only during a predetermined period in a cycle of strokes of the internal combustion engine, to increase a rotation speed of the engine, so that a decreased proportion of the combustion energy produced by the engine is converted into mechanical energy, to raise the temperature of the engine exhaust gas.

3. A device for controlling an internal combustion engine according to claim 2 wherein, in the warming assist operation, said predetermined period in which the drive assist unit assists the rotation of the engine includes at least part of the period from the start of combustion in the cylinder combustion chamber to the opening of the exhaust valve.

4. A device for controlling an internal combustion engine according to claim 3, wherein the drive assist unit includes a motor/generator coupled to the engine crankshaft, and said motor/generator is operated as a motor to assist the rotation of the engine.

5. A device for controlling an internal combustion engine according to claim 4 wherein, when it is necessary to raise the temperature of the engine exhaust gas, said motor/generator is, first, used as a generator that is driven by the engine crankshaft for a first predetermined period of time to operate the engine with a relatively high load to raise the temperature of the engine exhaust gas and, then, said warming assist operation is effected while operating the engine with a relatively low load for a second predetermined period of time that follows said first predetermined period of time to raise the temperature of the engine exhaust gas.

6. A device for controlling an internal combustion engine according to claim 5, wherein said engine is provided with a $NO_x$ occluding and reducing catalyst which is arranged in the exhaust gas passage to occlude the $NO_x$ in the exhaust gas by adsorption, absorption or by both of them when the air-fuel ratio of the exhaust gas flowing in is lean, and to purify by reduction the occluded $NO_x$ with reducing components in the exhaust gas when the air-fuel ratio of the exhaust gas flowing in becomes the stoichiometric air-fuel ratio or rich, and wherein the device raises the temperature of the engine exhaust gas during the sulfur contamination-removing operation for releasing, from the $NO_x$ occluding and reducing catalyst, the sulfur components occluded by the catalyst together with $NO_x$.

7. A device for controlling an internal combustion engine according to claim 6, wherein said engine is one for a hybrid vehicle provided with storage means for storing the electric power generated by said motor/generator, and is capable of being operated in a charging mode in which at least part of the engine output is converted into electric power by said motor/generator, and being operated in a driving mode in which the vehicle is driven by converting the electric power stored in said storage means into the mechanical energy by said motor/generator.

* * * * *